May 19, 1936.  R. S. SANFORD  2,041,492
BRAKE
Original Filed May 13, 1929

INVENTOR
Roy S. Sanford
BY
ATTORNEY

UNITED STATES PATENT OFFICE 2,041,492

BRAKE

Roy S. Sanford, South Bend, Ind., assignor to Bendix Brake Company, South Bend, Ind., a corporation of Illinois Application May 13, 1929, Serial No. 362,589
Renewed November 20, 1933

10 Claims. (Cl. 188—78)

This invention relates to brakes and is illustrated as embodied in an internal expanding brake for an automobile wheel.

The principal object of this invention lies in the provision of a very simple and effective operating means for the brake which will eliminate in large measure one of the principal sources of error in the brake controls and so-called "hookup" of present day use. Now it is the desideratum of all brake hook-ups and controls that the desired mechanical advantage thereof be attained with the least possible loss of energy due to friction, lost motion and distortion in the linkage.

The mechanical advantage of the entire transmission from service pedal to the brake cam is the result of the product of the several mechanical advantages of the various lever structures constituting said transmission. With the usual brake construction in an automotive vehicle, the mechanical advantage of the linkage up to the brake proper is practically equal to the resultant mechanical advantage referred to. The applying force thus stepped up often results both in distortion of the rigid control linkage immediately adjacent the brake and increased frictional losses and, with the employment of a flexible cable control, this increased pressure obviously tends to unduly stretch the cable.

I propose to obviate the above error of construction by obtaining the principal portion of the desired mechanical advantage within the housing of an internal expanding brake and to this end there is suggested the incorporation of a long armed lever as the principal brake operating member. This lever may be curved to avoid the wheel spindle and other interfering brake parts and preferably actuate the cam at one side of the brake and is preferably actuated in turn by a flexible tension element connected to its end at the other side of the brake. A lever moment arm almost equal to the diameter of the brake drum is thus presented, giving the desired applying force to the cam.

Figure 1:
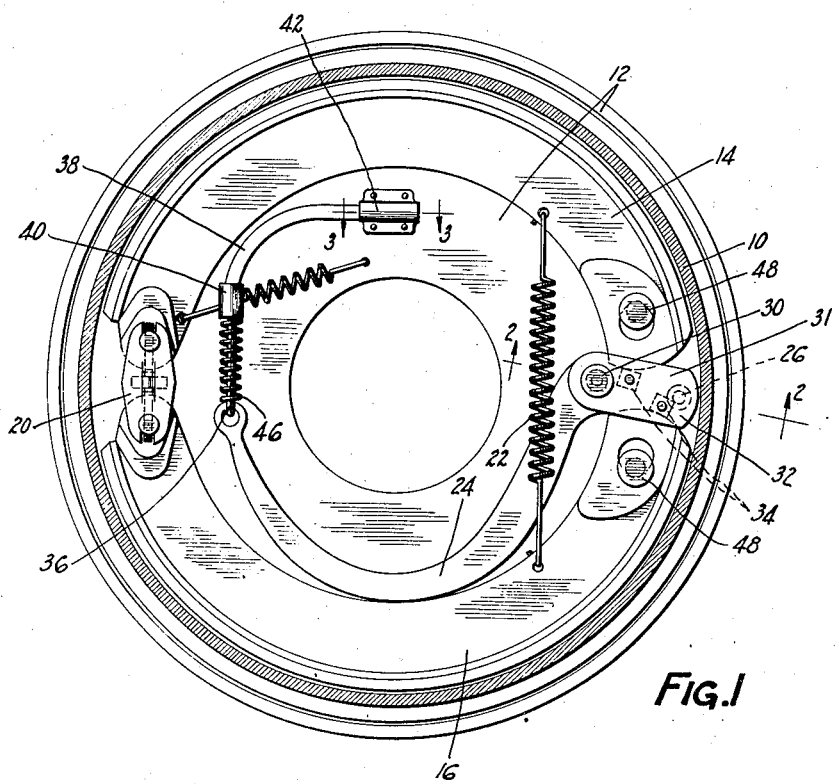
Figure 2:
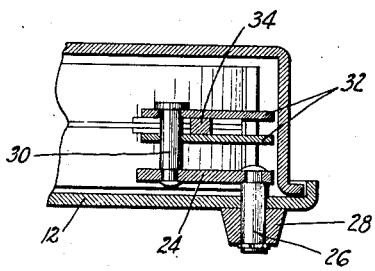
Figure 3:
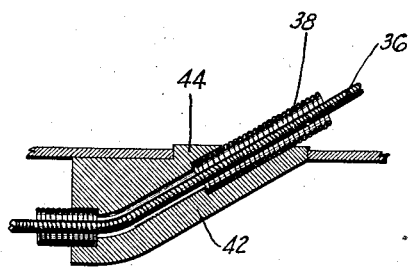

Further features of the invention relating to various combinations of parts and desirable details of construction will become apparent from the following detailed description of a preferred embodiment of my invention taken in conjunction with the accompanying drawing, in which:

Figure 1 discloses, in a vertical section taken through the brake drum flange, the parts of the brake in side elevation;

Figure 2 is a section taken on the line 2—2 of Figure 1 through the cam mechanism of the brake; and Figure 3 is a section taken on the line 3—3 of Figure 1 showing cable supporting conduit parts supported by a novel bracket in the support plate of the brake.

As disclosed in Figure 1, there is provided an internal expanding type of brake comprising the usual brake drum 10 and support plate 12, the two providing a housing for the brake proper. I prefer to employ a brake comprising two interchangeable T-sectioned brake shoes 14 and 16 connected at one side of the brake by means of an adjustable floating mechanism comprising a right and left threaded thrust link 20 pivotally connected to the adjacent ends of the shoes.

The important feature of my invention resides in the operating means for expanding the shoes into drum contact against the resistance of a vertically extending return spring 22 secured at its ends to the webs of the shoes. The operating structure preferably comprises a lever member 24 pivoted at the cam end of the brake to a pin 26, the latter having a firm bearing in the brake support plate 12 and in a reinforcing plate 28 secured to said support plate. Lever 24 is particularly characterized by its length and preferably extends to a point immediately adjacent the adjustable pivot structure 20 diametrically opposite the cam. The lever is curved as shown to avoid the wheel and axle parts and is preferably constructed of a flat stock arranged parallel to the support plate. As disclosed in Figure 1, the lever is pivoted to the pin 26 so as to lie as close as is practicable to the support plate, thereby obviating any appreciable overhang at the pin which might effect a distortion of the same.

The lever functions as a lever of the second class, being fulcrumed at the pin 26 and applies the cam through the intermediary of a pin 30 extending laterally from the lever a relatively short distance from the fulcrum and journaled in the ends of the cam. Cam 31 preferably comprises rectangular shaped plates 32 spaced in parallel relation, to straddle the ends of the brake shoes, by square thrust blocks 34 pivotally mounted on pins journaled in the plates, said blocks contacting the spaced apart ends of the brake shoes.

A further feature of my invention lies in the means for operating the aforementioned lever and may include a flexible tension element such as a steel cable 36 secured to one end of the lever and passed through a "Bowden" type of flexible conduit 38 within the brake housing. Conduit 38 is preferably secured at its ends in fittings 40 and 42 fixed to the support plate. Fitting 42 may take the form of a casting secured to the plate 12 by projection 44 and having a passage therethrough to receive the cable, which passage is of greater diameter at its ends to receive the ends of the conduit parts.

The brake operating mechanism outside the backing plate may take the form of a flexible cable and conduit or it may comprise the usual rigid transmission linkage. In any event its mechanical advantage is low—made possible by my novel operating means as described.

In operation, with actuation of the cable against the resistance of a lever return spring 46, the brake shoes are pried apart by the action of the cam to apply the brake. Both of the shoes are anchored on one or the other of anchor posts 48 secured to the plate 12, depending upon the direction of drum rotation, the wrapping action of the drum being augmented by the applying action of the cam. An exceedingly simple and very efficient brake operating mechanism is thus provided, effecting the desired brake applying force with a minimum of friction loss and distortion of the parts.

While one illustrative embodiment has been described in detail, it is not my intention to limit the scope of the invention to that particular embodiment, or otherwise than by the terms of the appended claims.

I claim:

1. A brake comprising, in combination, a rotatable drum, friction means having spaced apart ends, said means constructed to anchor at one or the other of said ends depending upon the direction of drum rotation, and means for applying said friction means into drum engagement comprising a relatively long lever having a cam member pivotally secured thereto intermediate its ends, said cam being arranged between said spaced apart ends.

2. A brake comprising, in combination, a rotatable drum, friction means having spaced apart ends, said means constructed to anchor at one or the other of said ends depending upon the direction of drum rotation and means for applying said friction means into drum engagement comprising a relatively long curved lever within the drum extending to a point diametrically opposite said ends and having a cam member pivotally secured thereto, said cam being arranged between said spaced apart ends.

3. A brake comprising, in combination, a rotatable drum, a floating friction means within said drum having spaced apart ends and means for expanding said ends to apply said friction means to said drum comprising a relatively long means lever member functioning as a lever of the second class, said lever being within the drum and fulcrumed to a member positioned immediately adjacent the braking flange of said drum.

4. A brake comprising, in combination, a rotatable drum, a floating friction device within said drum, said device having spaced apart ends and means for expanding said ends to apply said device to said rotatable drum comprising a lever device having its ends positioned at diametrically opposed points within said drum, said lever being actuated by a flexible tension element extending within said drum, part of said element being housed within said drum by a flexible conduit member.

5. A brake comprising a drum, friction means anchoring at one end when the drum is turning in one direction and at the other end when the drum is turning in the other direction, a lever inside the brake pivotally fulcrumed adjacent said ends, an applying device pivotally engaged by said lever and engaging said ends, and a lengthwise-movable tension element extending inside the brake and there connected to the free end of said lever.

6. A brake comprising a drum, friction means anchoring at one end when the drum is turning in one direction and at the other end when the drum is turning in the other direction, a lever inside the brake in the space at one side of the friction means, and parts carried by said lever and operatively engaging said ends, said lever being fulcrumed at one end and having connected to its other end a lengthwise-movable tension element extending exteriorly of the brake.

7. A brake comprising a drum and a backing plate forming an enclosed space, a pair of brake shoes linked together at two adjacent ends therein, anchor means therein adapted to be engaged by the other ends of said shoes, an actuating lever for the shoes within said space, a flexible cable attached to one end of said lever, a housing conduit for said cable extending short of the end of said cable, an aperture in said backing plate for said conduit to pass through, means for securing the conduit to the backing plate at an angle adjacent the aperture, and a spring threaded on the cable between said conduit and said lever.

8. A brake operating mechanism comprising a flexible conduit, a flexible cable slidable therein and projecting from the end of said conduit, a lever secured to the projecting end of said cable, a return spring sleeved on the cable between the end of said conduit and said lever, and means adjacent the end of said conduit for securing the conduit at an angle to a backing plate aperture, said means passing through the backing plate.

9. A brake operating mechanism comprising a flexible conduit, a flexible cable slidable therein and projecting from the end of said conduit, a lever secured to the projecting end of said cable, a return spring sleeved on the cable between the end of said conduit and said lever, and means adjacent the end of said conduit for securing the conduit obliquely to and passing through a backing plate aperture.

10. Brake mechanism for motor vehicles including in combination, a disc, said disc carrying the brake mechanism, a drum overlying said disc, brake shoes carried by said disc, a crank supported by said disc for moving the brake shoes into engagement with said drum, a flexible cable entering said disc and connected to said crank, said disc having a curved shoulder as a bearing for said cable, and means outwardly of said disc for actuating the cable to operate the brake.

ROY S. SANFORD.